United States Patent
Anderson et al.

(10) Patent No.: US 7,005,188 B2
(45) Date of Patent: Feb. 28, 2006

(54) TRANSPARENT SUBSTRATE WITH AN ANTIREFLECTION, LOW-EMISSIVITY OR SOLAR-PROTECTION COATING

(75) Inventors: Charles Anderson, Courbevoie (FR); Nicolas Nadaud, Gentilly (FR)

(73) Assignee: Saint-Gobain, Courbevoie (FR)

( * ) Notice: Subject to any disclaimer, the term of this patent is extended or adjusted under 35 U.S.C. 154(b) by 0 days.

(21) Appl. No.: 09/761,765

(22) Filed: Jan. 18, 2001

(65) Prior Publication Data
US 2001/0031365 A1 Oct. 18, 2001

Related U.S. Application Data

(63) Continuation of application No. PCT/FR00/01212, filed on May 17, 2000.

(30) Foreign Application Priority Data
May 20, 1999 (FR) ................................. 99 06407

(51) Int. Cl.
*B32B 17/06* (2006.01)
(52) U.S. Cl. .................. 428/432; 428/426; 428/428; 428/446; 428/448; 428/689; 428/699; 428/701; 428/702
(58) Field of Classification Search .............. 428/412, 428/426, 428, 432, 446, 448, 689, 698, 699, 428/702; 442/426, 428, 432, 446, 448, 689, 442/699, 701, 702
See application file for complete search history.

(56) References Cited

U.S. PATENT DOCUMENTS

| | | | |
|---|---|---|---|
| 3,432,225 A | 3/1969 | Rock | 350/164 |
| 3,565,509 A | 2/1971 | Sulzbach | 350/162 |
| 4,798,994 A * | 1/1989 | Rijpers et al. | 313/478 |
| 4,940,636 A | 7/1990 | Brock et al. | 428/426 |
| 5,073,451 A | 12/1991 | Iida et al. | 428/336 |
| 5,085,926 A | 2/1992 | Iida et al. | 428/216 |
| 5,105,310 A * | 4/1992 | Dickey | 359/586 |
| 5,332,618 A * | 7/1994 | Austin | 428/216 |
| 5,368,892 A | 11/1994 | Berquier | 427/299 |
| 5,389,427 A | 2/1995 | Berquier | 428/210 |
| 5,493,102 A * | 2/1996 | Takase et al. | 219/547 |
| 5,514,454 A | 5/1996 | Boire et al. | 428/216 |
| 5,578,536 A | 11/1996 | Kameyama et al. | 501/103 |

(Continued)

FOREIGN PATENT DOCUMENTS

JP 59-184744 * 10/1984

(Continued)

OTHER PUBLICATIONS

Applied Optics, All-Oxide Broadband Antireflection Coatings By Reactive Ion Plating Deposition, By M. Buehler et al., vol. 27, No. 16, Aug. 17, 1988, pp. 3359-3361.

*Primary Examiner*—Terrel Morris
*Assistant Examiner*—Andrew T. Piziali
(74) *Attorney, Agent, or Firm*—Oblon, Spivak, McClelland, Maier & Neustadt, P.C.

(57) ABSTRACT

A transparent substrate and methods of making a transparent substrate having, on at least one of its faces, an antireflection coating made of a multilayer stack of alternating thin layers of high and low refractive indices. Preferably, the thin layers are based on a dielectric material. At least one of the thin high-index layers comprises titanium oxide which is modified so as to reduce its refractive index to a value of at most 2.40, preferably to a value of at most 2.35.

19 Claims, 1 Drawing Sheet

U.S. PATENT DOCUMENTS

| | | | |
|---|---|---|---|
| 5,618,579 A | 4/1997 | Boire et al. ................. | 427/166 |
| 5,719,705 A * | 2/1998 | Machol ...................... | 359/581 |
| 5,800,933 A * | 9/1998 | Hartig et al. ................ | 428/34 |
| 5,821,001 A * | 10/1998 | Arbab et al. ................ | 428/623 |
| 5,935,702 A | 8/1999 | Macquart et al. ........... | 428/336 |
| 5,948,544 A * | 9/1999 | Kim et al. ................... | 428/480 |
| 5,981,059 A * | 11/1999 | Bright et al. ................ | 428/336 |
| 6,037,289 A | 3/2000 | Chopin et al. ............... | 502/2 |
| 6,042,934 A | 3/2000 | Guiselin et al. ............. | 428/213 |
| 6,103,363 A | 8/2000 | Boire et al. ................. | 428/325 |
| 6,238,781 B1 * | 5/2001 | Anderson et al. ........... | 359/580 |
| 6,436,541 B1 * | 8/2002 | Sopko et al. ................ | 428/432 |

FOREIGN PATENT DOCUMENTS

| | | | |
|---|---|---|---|
| JP | 60081047 | * | 5/1985 |
| JP | 63131101 | * | 6/1988 |

* cited by examiner

TRANSPARENT SUBSTRATE WITH AN ANTIREFLECTION, LOW-EMISSIVITY OR SOLAR-PROTECTION COATING

CROSS REFERENCE TO RELATED APPLICATIONS

This application is a continuation of the U.S. national stage designation of International Application No. PCT/FR00/01313, filed May 17, 2000, the contents of which are expressly incorporated herein by reference thereto.

BACKGROUND OF THE INVENTION

The invention relates to transparent substrates based on organic polymer(s) or glass, that are provided with an antireflection coating and to their method of manufacture. The invention further relates to their use, especially as glazing.

BACKGROUND OF THE INVENTION

An antireflection coating typically consists of a multilayer stack comprising interferential thin layers, generally of alternating layers having high and low refractive indices. When deposited on a transparent substrate, the antireflection coating has the function of reducing its light reflection, and therefore increasing its light transmission. Therefore, a coated substrate has its ratio of transmitted light/reflected light increased, thereby improving the visibility of objects placed behind it.

An antireflection coating can therefore be employed in many applications, for example, for protecting a painting lit by a light placed behind the observer, or for constituting or forming part of a shop window, so that articles displayed in the window may be more clearly distinguished, even when the internal lighting is low compared with the external lighting.

The optical performance of an antireflection coating can be assessed by various criteria. An antireflection coating is considered to be effective if it can lower the light reflection of a substrate made of standard clear glass down to a given value, for example, 2%, or even 1% and less. The colorimetry of the resulting glazing is also important. Most often attempts are made to ensure that the coating does not substantially modify the color appearance of the bare substrate and, in general, to assure that the appearance is as neutral as possible.

Furthermore, secondary criteria may also be considered, depending on the application, in particular, the chemical and/or mechanical durability of the coating or its ability to undergo heat treatments without deterioration. Another important factor is the ability to produce the coating on an industrial scale; which depends on the deposition technique used, on the cost and nature of the constituent materials of the multilayer stack, on the cycle time needed to produce the coating, on the size and shape of the substrate, and the like.

Optimizing, at least from the optical standpoint, the thicknesses and refractive indices of the antireflection coating layers has been the subject of numerous publications. With regard to four-layer antireflection coatings, which offer a good compromise between the desired antireflection effect of the product and its manufacturing cost, mention may be made, for example, of U.S. Pat. No. 3,432,225, describing multilayer stacks of the $(ZrO_2/MgF_2)_2$ type, U.S. Pat. No. 3,565,509, describing multilayer stacks of the $(CeO_2/MgF_2)_2$ or $(CeO_2/SiO_2)_2$ type, and the publication "All-oxide broadband antireflection coating . . ." by N. Buehler et al., 15 Aug. 1998 (Applied Optics Vol. 27, No. 16) describing $(TiO_2/SiO_2)_2$ multilayer stacks.

This latter type of multilayer stack is advantageous since it uses, as the constituent material, high-index layers of titanium oxide, which effectively have an index of about 2.45. This material is advantageous in that it can be deposited in a known manner by magnetically-enhanced reactive sputtering, in an oxygen atmosphere, using commercially available low-cost titanium targets. Its use, however, is not devoid of drawbacks. For example, although incorporating it into an antireflection coating allows very low levels of reflection to be achieved, it is not optimal with regard to the "stability" of the appearance of the coated substrate in reflection. By "stability" of the appearance of the coated substrate in reflection is meant the following two points:

1. The stability as a function of the angle of incidence, i.e., it is preferable for changes in reflected intensity and in tint in reflection to be as small as possible when the angle of incidence changes from being normal to the glazing to a more grazing angle of incidence (or, more generally, from a given angle of incidence, corresponding to the most probable angle of incidence at which the glazing may be observed, to an angle of incidence which is different); and 2. The stability as a function of variations in the thicknesses of the layers, at a fixed angle of incidence, i.e.,. That the appearance in reflection remains almost unchanged even though there is, depending on the production tools available, a certain variability in the thicknesses and/or refractive indices of the layers actually deposited.

Thus, there is a need for improved antireflective coatings. Indeed, stability with regard to the angle of incidence is becoming more and more of a requisite for a variety of applications, such as vehicle windscreens or display screens, for example.

SUMMARY OF THE INVENTION

The invention is directed to a transparent substrate having at least one surface that includes, on at least one of its surfaces, an antireflection coating made of a multilayer stack of alternating thin layers of high and low refractive indices, wherein at least one of the high-index thin layers is titanium oxide which is modified to reduce its refractive index to a value of at most 2.40. Preferably, the refractive index of the at least one high-index thin layer of titanium oxide is between 2.25 and 2.38. The thin layers may be made of a dielectric material, a low emissivity material, or a solar-protection coating.

In one embodiment the thin layer of titanium oxide is modified by incorporating nitrogen into the titanium dioxide in an amount of 1 to 20 percent.

In a second embodiment, the thin layer of titanium oxide is modified by incorporating at least one dopant metal into the titanium oxide, wherein the oxide of the dopant metal has a lower refractive index than that of titanium oxide. Preferably, the index of refraction of the dopant metal oxide is between 1.9 and 2.3. The dopant metal may be one or more of Ta, Zr, Sn, In, Zn, or Al and the atomic percentage of the at least one dopant metal with respect to the amount of titanium may be at most 40 percent.

In a third embodiment, the thin layer of titanium oxide is modified by lowering the density of the titanium oxide thin layer to a value that is 80 to 95 percent of the theoretical density of titanium oxide.

In a fourth embodiment, the high-index thin layer of titanium oxide is a high-index multilayer containing at least one titanium oxide layer and at least one additional high index layer, wherein the additional high index layer has a refractive index of at most 2.3. The at least one additional high index layer may have a refractive index of between 1.9 and 2.2 and may be tantalum oxide, zirconium oxide, tin oxide, indium oxide, zinc oxide; silicon nitride; or aluminum nitride. Preferably, the high-index multilayer is two contiguous layers and the additional high index layer is closer to the substrate than the titanium oxide layer. The absolute value of the difference between the refractive index of the additional high index layer less the refractive index of the titanium oxide layer may be between 0.1 and 0.6.

The refractive indices of the low index thin layers may be between 1.30 and 1.65 and may be one or more of silicon oxide, aluminum oxide, aluminum oxyfluoride, aluminum fluoride, and magnesium fluoride. Optionally, the oxides are halogenated. Preferably, the thin layer of the antireflection coating most removed from the substrate is a low index layer of $SiO_2$—$Al_2O_3$, wherein the atomic percent of aluminum with respect to silicon is from 5 to 20 percent.

Preferably, the multilayer stack of alternating thin layers of high and low refractive indices has a formula (high-index layer/low-index layer)$_n$, wherein n is 2 or 3.

In another embodiment of the transparent substrate of the invention, at least one of the alternating thin layers of high and low refractive index is replaced with an intermediate refractive index layer having a refractive index of between 1.65 and 1.85. Preferably, the intermediate refractive index layer replaces the alternating thin layer of high and low refractive index that is closest to the substrate. The intermediate refractive index layer may be silicon oxynitride; silicon oxycarbide; or a mixture of silicon oxide and tin oxide, zinc oxide, titanium oxide, or tantalum oxide.

The invention also relates to a glazing that includes the antireflection coating of the invention. The glazing may further include a layer or multilayer stack that is a solar protection layer, a heat absorbing layer, a UV protecting layer, an antistatic layer, a low emissivity layer, a heated layer, an anti-fouling layer, a hydrophobic organic layer having an anti-rain function, a hydrophilic organic layer having an anti-fogging function, or a silvering layer. The glazing may be extra-clear glass or solid-tinted glass and the glazing may optionally be toughened, reinforced, curved, or bent. The glazing may include a transparent polymer material such as a polycarbonate or a polyacrylate. The glazing may be adapted for use as the internal or external glazing for buildings, to protect paintings, a motor-vehicle window, a mirror, a display screen, a decorative glass, a shop window, a shop-counter, or a refrigerated display-cabinet.

DETAILED DESCRIPTION OF THE PREFERRED EMBODIMENTS

Figure 1:
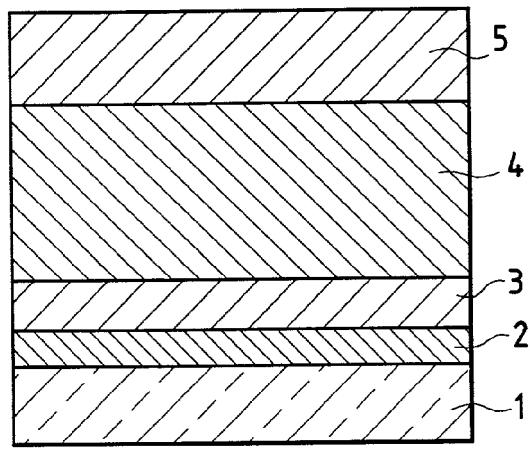
FIG. 1 depicts a substrate with an antireflective coating of the invention.

The invention is directed to a novel type of antireflection coating that alleviates the above-mentioned drawbacks, while increasing the optical performance, in particular, by giving the coated substrate greater "stability" in its appearance in reflection. In particular the invention provides a novel type of antireflection coating that better reconciles optical performance with the requirements of economically manufacturing this type of product on an industrial scale.

The invention is a transparent substrate having, on at least one of its faces, an antireflection coating made of a multilayer stack comprising alternating thin layers of high and low refractive indices. Preferably the thin layers are based on dielectric materials. Within this multilayer stack, at least one of the thin layers having a high index comprises titanium oxide which is modified so as to reduce its refractive index to a value of at most 2.40, preferably at most 2.38, and more preferably at most 2.35. Preferably, the refractive index is between 2.25 and 2.38, more preferably between or 2.25 and 2.35 at a wavelength of 580 nm.

In another embodiment of the invention the transparent substrate has the same type of layer, based on modified titanium oxide, but the layer is incorporated into a multilayer stack of the low-emissivity or solar-protection (also called "solar control") type.

Modifying the titanium oxide in this way is advantageous since, by lowering the index, the "stability" of the appearance of the coated substrate in reflection, as described above, can be significantly improved. With regard to stability as related to thickness variability, the invention makes it possible, with standard production tools, to increase productivity and to reduce the amount of scrap substrates which do not comply with optical specifications. Furthermore, by retaining titanium oxide, rather than replacing it with another material, it is advantageously possible to use deposition technology that is well known for this type of material. The invention proposes, in a non-limiting manner, four different methods of obtaining the modified titanium oxide. Each of these methods can be used alone or the methods can be combined.

The first method of realizing the invention consists of chemically modifying the titanium oxide by the incorporation of nitrogen. Thus, a titanium oxynitride is obtained with a nitridation level which can vary between 1 and 20% and which can be adjusted to obtain the desired reduction in refractive index. This nitridation can be controlled by using a sputtering method of deposition, especially magnetically-enhanced sputtering, and using titanium targets in a reactive atmosphere that contains both $O_2$ and $N_2$ in appropriately defined proportions. Thus, it is possible to obtain nitrided titanium oxide having a refractive index of approximately 2.35 at 550 nm for an $N_2/(N_2+O_2+Ar)$ ratio of approximately 17% by volume in the deposition chamber (an $N_2/O_2$ ratio in the deposition chamber, measured as a volume percentage, varying between 0.2 and 1.8 allows the refractive index to be adjusted to values of about 2.31 to 2.41). An additional advantage of this method is that $TiO_xN_y$ can be deposited by reactive sputtering at a substantially greater rate than $TiO_2$. The $TiO_xN_y$ formed is virtually non-absorbing, and has a light absorption of less than 2%, unlike TiN.

The second method of realizing the invention also consists of chemically modifying the titanium oxide, by the incorporation of at least one "dopant" metal, Me, the oxide of which has a lower index than that of titanium oxide, especially an index of at most 2.3 and preferably of between 1.9 and 2.2. The term "dopant," as used herein, does not have the meaning that it may have in the semiconductor field. It is used here merely to emphasize that it is a metal, present in a minor amount, and even a very minor amount, compared with titanium, with which it forms a mixed oxide.

Preferably, the dopant metal, Me, is chosen from at least one of the following metals: Ta, Zr, Sn, In, Zn and Al.

Advantageously, the atomic percentage of the dopant metal or metals, Me, with respect to the titanium in the $\Sigma Me/Ti$ layer is at most 40%, preferably at most 35%, and more preferably at most 30%. For example, the atomic percentage of the dopant metal or metals, may be between 0.1 and 20% and preferably between 2 and 10%. In fact, the amount of Me in the titanium oxide is varied so as to obtain the desired final refractive index, similar to how the nitridation level in the first method is varied so as to obtain the desired final refractive index. If the deposition method is chosen to be sputtering, it is possible, for example, to carry out reactive deposition in the presence of oxygen using a target of titanium alloyed with the dopant metal or metals, Me, in appropriate proportions (these proportions being close to those to be found in the layer). Alternatively, a target of pure titanium target partially covered with the "dopant" metal in metallic form can be used.

It is noted that, in this method, the presence of the dopant metal in the titanium oxide not only modifys its refractive index but can also gives it additional functionality. For example, the presence of cerium can give the layer, and therefore the coating in its entirety, UV filtration properties. As in the case of nitridation, such "doping" of the titanium oxide also allows the rate of deposition of the layer to be increased when the sputtering deposition method is used. The higher the sputtering efficiency of the "dopant" metal, the greater the increase in deposition rate. For example, the increase in deposition rate, in increasing order, is Zr, then Ta, then Zn, and then Sn.

The third method for realizing the invention consists of physically modifying the titanium oxide structure, in particular by lowering its density and increasing its porosity. The deposition parameters for producing the layer, in particular the pressure at which the titanium oxide is deposited by reactive sputtering, may be adjusted in order to obtain a layer whose density is, for example, only 80 to 95% of its theoretical density, i.e., that which corresponds to the standard index of titanium oxide, namely about 2.45. This method is technically advantageous since it allows standard titanium targets to be used.

The fourth method for realizing the invention involves incorporating the titanium oxide layer into a high-index multilayer by combining the titanium oxide layer with at least one other high-index layer, but the index of the latter being at most 2.3, so as to reduce the "overall" or "mean" refractive index of the multilayer. According to this method it is possible to continue to use standard $TiO_2$ layers having an index greater than 2.35 by incorporating the high-index layer into a superposition of layers of different materials. A high-index multilayer is therefore obtained whose overall index is less than that of standard $TiO_2$. It is possible to calculate the overall index by taking the ratio of the sum of the optical thicknesses of all the layers forming the multilayer to the sum of their physical thicknesses. Therefore, to achieve the desired "overall" refractive index, either the physical thickness of each of the layers or the refractive index of each of the layers of the high index multilayer can be adjusted. In order for this high-index multilayer to have an equivalent optical function as that of the usual monolayer, the high-index multilayer is preferably given an overall optical thickness that is identical to that of the monolayer. This means that, in the multilayer, it is necessary to use $TiO_2$ layers which are thinner than the thicknesses required when they are used as a monolayer. This, however, is advantageous from the industrial standpoint since the sputter deposition rate of titanium oxide tends to be quite low.

Especially in the second and fourth methods of realizing the invention, it has further been observed that the multilayer stacks can be curved or toughened, being able to undergo heat treatments above 500° C., without appreciable optical damage. This is presumably due to a lower crystallization of the modified $TiO_2$ under the effect of heat.

The other layer or layers of the multilayer preferably have a refractive index of between 1.9 and 2.2. Preferably, they are chosen to be based on metal oxide(s) of the tantalum oxide ($Ta_2O_5$), zirconium oxide ($ZrO_2$), tin oxide ($SnO_2$), indium oxide ($In_2O_3$) or zinc oxide (ZnO) type or based on silicon nitride $Si_3N_4$ or aluminum nitride AlN. As seen above, the choice of one of these materials can be dictated by their nature and/or by their sputter deposition rate being greater than that of $TiO_2$. Furthermore, as in the case of the second method of realizing the invention, the additional layers may give the multilayer stack an additional functionality.

According to the fourth method of realizing the invention, one particular configuration that has proved to be favorable to stability of the appearance in reflection is a configuration wherein the multilayer comprises two contiguous layers of which one layer comprises titanium oxide and the two layers having a negative refractive index difference $\Delta i$ when they are counted from the substrate. This means that if one of the layers is the $n^{th}$ layer counted from the substrate and the next one is the $(n+1)^{th}$ layer, then the index difference $\Delta i$ (i.e., the index of the $n^{th}$ layer less the index of the $(n+1)^{th}$ layer) is negative. In other words the layer with the higher index (in this case the $TiO_2$ layer) is further from the substrate.

Similarly, a preferred configuration, which may be combined with the above configuration, is one in which, in absolute values, these two contiguous layers have an index difference $\Delta i$ of between 0.1 and 0.6, preferably between 0.4 and 0.5, and more preferably greater than 0.4. Indeed, it is easiest to reduce the overall index of the multilayer by choosing a material to be associated with the $TiO_2$ layer whose index is substantially different from that of $TiO_2$.

According to the invention, the low-index layers of the antireflection coating have refractive indices of between 1.30 and 1.65. Advantageously, these may be made of silicon oxide ($SiO_2$), aluminum oxide ($Al_2O_3$), aluminum oxyfluoride $AlO_xF_y$, aluminum fluoride (AlF), magnesium fluoride ($MgF_2$), or mixtures thereof, these optionally being halogenated with regard to the oxides (i.e., fluorinated oxides).

Thus, measures may be taken to ensure that at least one of the low-index layers of the antireflection multilayer stack is based on a mixture of silicon oxide and aluminium oxide (optionally a fluorinated mixture). Preferably, the last layer of the multilayer stack is based on a mixture of silicon oxide and aluminum oxide because such a "mixed" oxide layer has better durability, especially chemical durability, than a pure $SiO_2$ layer. The optimum amount of aluminium in the layer is selected in order to obtain this better durability but without excessively increasing the refractive index of the layer with respect to that of pure silica in order not to affect the optical antireflection properties. Aluminium oxide has an index of about 1.60 to 1.65, which is greater than that of $SiO_2$ which is about 1.45. The preferred atomic percentage of Al with respect to Si is, for example, from 5 to 20%, preferably about 8 to 12%, and more preferably about 10%. It is not excluded, however, for at least one of the layers, namely a low-index layer, in the multilayer stack to be a low-index "multilayer,"

in a similar manner to the high-index "multilayer" of the fourth method of realizing the invention as discussed above.

According to the invention, the antireflection coating may be in the form of a multilayer stack of the (high-index layer/low-index layer)$_n$ type, wherein n=2 or 3. The embodiment where n is equal to 2 corresponds to a four-layer antireflection coating. Advantageously, the optical thickness of each layer (the layers being counted from the substrate) are:

for the high-index first layer: about $\lambda/15$, with $\lambda=580$ nm, and therefore about 18 to 22 nm (with, for example, a refractive index of about 2.00);

for the low-index second layer: about $\lambda/11$, with $\lambda=580$ run, and therefore about 32 to 38 nm (with, for example, a refractive index of about 1.48);

for the high-index third layer: about $\lambda/2$, with $\lambda=580$ nm, and therefore about 105 to 125 nm (with, for example, a refractive index of 2.45); and for the low-index fourth layer: about $\lambda/4$, with $\lambda=580$ nm, and therefore about 80 to 90 nm (with, for example, a refractive index of 1.48).

It should be clearly understood that here, and throughout the rest of the text, the term "layer" can mean a "multilayer" and that, in the latter case, its optical thickness is the sum of the optical thicknesses of the layers of which it is composed.

Another embodiment consists of replacing, in the multilayer stack described above, one of the (high index layer/low-index layer) sequences with a single "intermediate-index" layer, for example, one having an index of between 1.65 and 1.85, preferably about 1.75 to 1.80. Preferably, it is the first sequence, counting from the substrate, which is replaced with the intermediate-index layer, the optical thickness of the intermediate-index layer being about 80 to 120 nm.

The intermediate-index layer has an optical effect very similar to that of a high-index layer/low-index layer sequence and has the advantage of reducing the overall number of layers in the multilayer stack. Advantageously, it is based on a mixture of silicon oxide and tin oxide, of silicon oxide and zinc oxide, or of silicon oxide and titanium oxide, or, alternatively, it may be based on silicon oxynitride or aluminium oxynitride. The relative proportion between the various constituents of these materials allows the refractive index of the layer to be adjusted.

It is possible to employ the reactive sputtering technique using, respectively, a target based on the desired alloy in the presence of oxygen and optionally of nitrogen in the case of a mixed oxide layer, and a silicon or aluminum target in the presence of an $O_2/N_2$ mixture in appropriate proportions in the case of silicon oxynitride ($SiO_xN_y$) or aluminium oxynitride ($AlO_xN_y$) layers. By adjusting the deposition conditions it is possible to vary the index of the $SiO_xN_y$ layers within a range from 1.46 to 2.1 and the index of the $AlO_xN_y$ layers within a range from 1.65 to 2.1.

There are also simple oxides, compatible with the desired index range, and which can be deposited by reactive sputtering, such as certain rare-earth oxides ($La_2O_3$) or the like ($Y_2O_3$), but the cost of the targets is high.

With regard to the high-index layers, apart from those based on $TiO_2$ modified according to the invention, which layers may form part of the coating, these preferably have an index of at least 1.9 to 2.0 and preferably between 1.9 and 2.2. They may be the oxides of the ZnO, $Ta_2O_5$, $SnO_2$, $Nb_2O_5$, or $ZrO_2$ type. They may also be made of silicon nitride or aluminium nitride. The latter nitride-based materials have an additional advantage in that they form an effective barrier to the migration of alkali-type species which can migrate from the glass, when the substrate is of the glass type. In addition, they also form an effective barrier against oxidation. When used in an appropriate configuration, these materials form an integral part of the coating and may give the coating the ability to withstand heat treatments without becoming damaged, especially heat treatments of the annealing, toughening, or curving type, when the carrier substrate is made of glass. Alternatively, it is possible to deposit the coating on the glass substrate once it has undergone its heat treatment, i.e., once it has been annealed, toughened, and/or curved.

It should be noted, however, that the invention also applies to so-called plastic substrates based on one or more organic polymers, such as rigid substrates based on polycarbonate or polymethyl methacrylate (PMMA). They may also be "flexible" plastic substrates which, once they have been functionalized on one face by the antireflection coating, will then be applied to a rigid substrate, for example a substrate of the glass type.

Moreover, the titanium oxide modified according to the invention may also be used advantageously in multilayer coatings other than antireflection coatings. In particular, it may be incorporated as a dielectric layer in multilayer stacks of the low-emissivity or solar-protection type, using one or more functional layers made of a metal of the Ag type or of a metal nitride of the TiN, ZrN, or NbN type, combined with layers made of dielectric material. These types of multilayer stack are described, for example, in EP-718,250, EP-638, 528, EP-638,527, and EP-650,938. A commercially available low-emissivity multilayer stack is sold under the name "Planitherm" by Saint-Gobain Vitrage. The functionalized layers may also be made of Ni, NiCr, stainless steel, or inconel.

Preferably, each of the faces of the substrate has an antireflection coating according to the invention, in order to obtain the maximum antireflection effect. As mentioned, the materials involved in the antireflection coating are generally dielectric materials, however, it is possible for them to be at least slightly conducting, for example, by doping a metal oxide in the multilayer stack (for example, fluorine-doped or antimony-doped $SnO_2$ or aluminium-doped ZnO), thereby possibly giving the overall coating an additional antistatic functionality. Methods of doping a metal oxide are well known to those of ordinary skill in the art.

The invention is also directed to a glazing which incorporates the coated substrates. The glazing may be, for example, a monolithic glazing, laminated glazing, or multiple glazing having one or more intermediate gas-filled cavities. The glazing may be used as an internal or external glazing for buildings; as glass for protecting objects of the painting type; as shop-windows; as glass furniture, such as a shop counter or a refrigerated display cabinet; as a glazing in motor vehicles of the laminated-windscreen type; mirrors; anti-dazzling screens for computers; decorative glass; and all types of display screens.

The glazing incorporating the substrate with an antireflection coating according to the invention may have additional useful properties. Thus, it may be a glazing having a safety function, such as the laminated glazing sold by Saint-Gobain Vitrage under the name Stadip, or a toughened glazing such as the toughened glass sold by Saint-Gobain Vitrage under the name Sekurit. It may also be an anti-break-in glazing, such as that sold by Saint-Gobain Vitrage under the name Contrasonor (double glazing) or Phonip (laminated glazing). The glazing may also be a fire protection glazing (flame barrier or fire barrier).

The glazing may also be chosen so that a layer (or a multilayer stack) having a specific function is deposited on a substrate already provided with the antireflection multilayer stack or on one of the faces of other substrates that make up the glazing. The layer having a specific function, may be, for example, a solar-protection or heat-absorbing layer, such as titanium nitride layers (as described in the aforementioned patents) or layers such as those sold under the name Cool-lite or Antelio or Cool-lite K by Saint-Gobain Vitrage; or layers having an UV protection or antistatic function (of the slightly conducting doped metal oxide layer type); or layers having a low emissivity function, like the silver-based layers of the Planitherm type (which are described, for example, in the aforementioned patents) or EKO-type doped tin oxide layers sold by Saint-Gobain Vitrage. In the case of a layer having an antistatic function, it is preferable for the antistatic layer to be placed on that face of the substrate which is provided with the antireflection multilayer stack. The layer may also be designed to provide heat (of the type comprising a metal layer with suitable current leads), something which would be especially advantageous in the case of refrigerated display cabinets in order to prevent their surfaces from fogging. It may also be a layer having anti-fouling properties, such as a very thin layer of $TiO_2$ (described, for example, in WO-97/10186 and WO-97/10185); a hydrophobic organic layer with an anti-rain function; or a hydrophilic organic layer with an anti-fogging function. As an example of a hydrophobic layer, reference may be made to the fluorinated-organosilane-based layers described in U.S. Pat. Nos. 5,368,892 and 5,389,427. These layers may be deposited on the antireflection coating or directly on the substrate if the substrates other face is not treated with an antireflection coating.

The glazing may also have a silvering layer that function as a mirror. All configurations are possible. Thus, in the case of a monolithic glazing having a mirror function, it is advantageous to deposit the antireflection coating on the first face of the substrate (that is to say on the same side as the observer) and the silvering layer on the second face of the substrate (that is to say on the side where the mirror is attached to a wall), the antireflection multilayer stack of the invention thus prevents duplication of the reflected image.

In the case of a double glazing (wherein the faces of the glass substrates are conventionally numbered starting with the outermost face), the antireflection multilayer stack usually being on the first face of the substrate and the other functional layers on the second face of the substrate in the case of a UV-protection or solar-protection layer, or on the third face of the substrate in the case of a low emissivity layer. In double glazing, it is also possible to have at least one antireflection multilayer stack on one of the faces of the substrates along with at least one other layer or another multilayer stack providing an additional functionality. The double glazing may also have several antireflection coatings, especially on at least the second or third face of the substrate.

In the case of monolithic glazing, a layer having an antistatic function together with a second antireflection multilayer stack may be deposited.

Similarly, the glass chosen for the substrate coated with the multilayer stack according to the invention, or for the other substrates which are combined with the glass to form a glazing assembly, may be a special glass, for example, extra-clear glass, of the type sold by Saint-Gobain Vitrage under the name Diamant; a clear glass of the Planilux type; or tinted glass of the Parsol type, both products sold by Saint-Gobain Vitrage. The glass itself may filter out ultraviolet-type radiation. The substrate or substrates may also be subjected to heat treatments, namely toughening, curving or even bending, that is to say curving to a very small radius of curvature (in particular this is used for counter/display cabinets in shops). It has been demonstrated that the antireflection coating deposited on an extra-clear glass gives the glazing extraordinary transmissibility.

The substrate may also have undergone a surface treatment, especially an etching or frosting treatment, the antireflection multilayer stack being deposited on either the etched face or on the opposite face. The substrate, or one of the substrates with which it is combined, may also be of the decorative, printed, or screen-printed type of glass.

A particularly useful glazing that incorporates a substrate with an antireflection coating according to the invention is a glazing having a laminated structure with two glass substrates joined together by a sheet of polymer of the polyvinyl butyral type. At least one of the substrates, preferably both, is provided with the antireflection coating according to the invention, preferably on the external face, preferably in the sequence antireflection coating/glass/PVB/glass/antireflection coating.

This configuration, especially with two curved and/or toughened substrates, makes it possible to obtain a highly advantageous motor-vehicle glazing, especially a windscreen. Motor-vehicle standards demand that windscreens have a high light transmission of at least 75% at normal incidence. By incorporating antireflection coatings in a standard laminated windscreen structure, the light transmission of the glazing is increased, which in turn allows its energy transmission to be slightly reduced while still complying with the light transmission standards. Therefore, it is possible to increase the solar-protection effect of the windscreen, for example, by absorption by the glass substrates. Specifically, it is possible to make the light reflection value of a standard laminated windscreen go from 8% to less than 1%, while reducing its energy transmission by 1 to 10%, for example, by making it go from 85% to 81%. Darker tinted glass, exhibiting greater solar protection, can therefore be used, since the drop in light transmission is compensated for by virtue of the antireflection coating.

The invention is also directed to a process for manufacturing glass substrates having an antireflection coating. One embodiment of the process involves depositing all the layers by a vacuum technique, especially by magnetically-enhanced sputtering. Thus, it is possible to deposit the oxide layers by reactive sputtering of the desired metal in the presence of oxygen, the nitride layers in the presence of nitrogen, and the oxynitride layers in the presence of nitrogen and oxygen. Alternatively, all or some of the layers of the multilayer stack, especially the first layer or layers, may be deposited by a chemical vapor deposition technique using suitable precursors.

Whatever mode of implementation is chosen, the invention makes it possible to manufacture substrates which, once they have been functionalized with the antireflection multilayer stacks described above, have a light reflection, $R_L$, of at most 2 and preferably of at most 1% at normal incidence (of course, by suitably modifying the optical thicknesses of the layers in the multilayer stack it is also possible to choose to minimize the light reflection at an angle of incidence away from the normal, something which is advantageous, for example, in the case of a windscreen which is inclined to the vertical by approximately 65°).

Similarly, the colorimetry in reflection of the substrates which have been functionalized with the antireflection coatings of the invention are particularly stable compared with known antireflection coatings, especially those using standard $TiO_2$ as the high index material. Thus, even when the minimization of light reflection is optimized at normal incidence, the reflection value and the tint in reflection are barely altered, even when the substrate is observed at angles of incidence substantially away from the normal.

In particular, the signs of a* and b* in the (L*, a*, b*) colorimetry system remain unchanged, even at unfavorable incidences, especially a grazing incidence. The fact that the signs of a* and b* do not change means that there is no "switching" from one tint to another, especially from a favorable tint in the blue or blue-green (a* and b* both negative) to a less favorable tint (where a* and/or b* become positive, corresponding to the yellow, violet, or red tints). Any increase in the saturation c* ($c^*=(a^{*2}+b^{*2})^{1/2}$), a characteristic which takes into account the intensity of the color, is also limited.

The antireflection coatings of the invention further allow variability in the thicknesses of the layers of which they are composed on the order of, for example, ±2% without appreciably modifying its appearance in reflection. Again, the signs of a* and b* are preserved (with, in order to give orders of magnitude, differences in a* and b* values, denoted by Δa* and Δb*, of at most 2 in absolute value).

EXAMPLES

The details and advantageous characteristics of the invention will now emerge from the following non-limiting examples, with the help of FIGS. 1 to 4. The highly schematic FIGS. 1 to 4 represent, in cross section, a substrate coated with an antireflection multilayer stack according to the invention (the thickness of the substrate and the layers have not been represented proportionally in order to make the figures easier to examine). In fact, each of the faces of the substrate is provided with an identical multilayer stack, but only a single multilayer stack has been shown for the sake of clarity. A coating on each of the faces of the substrate has been used in all the examples which follow and which relate to glazing which are intended for use in buildings.

It should be mentioned that, in these examples, the thin layers are successively deposited by magnetically-enhanced reactive sputtering, but that they could be deposited by any other vacuum or chemical vapor deposition technique that allows good control of the thicknesses of the resulting layers.

The substrates on which the antireflection coatings are deposited are 4 mm thick and are of clear silica-soda-lime glass of the Planilux type.

Example 1

This example corresponds to FIG. 1 and comprises a glass 1 coated with an antireflection multilayer stack according to the invention 6 which is composed of two high-index thin layers 2, 4 and two low-index thin layers 3, 5. The low-index layer 3 is made of $SiO_2$; the low-index layer 5 is a mixture of silicon and aluminum oxides $SiAl_xO_y$ (approximately 10 atomic percent % of Al with respect to Si); the high-index layer 2 is made of $SnO_2$; and the high-index layer 4 is titanium oxide modified by partial nitridation according to the invention, the material corresponding to the formula $TiO_xN_y$ with the level of nitridation being adjusted in order to achieve a refractive index of about 2.35 at 580 nm, i.e., a nitrogen ratio in percent by volume, $N_2/(N_2+O_2+Ar)$, of about 15 to 20% in the deposition chamber.

Table 1 below gives the index and the physical and optical thicknesses of the layers in the multilayer stack.

TABLE 1

| Glass (1) | Index | Physical Thickness (nm) | Optical Thickness (nm) |
|---|---|---|---|
| $SnO_2$ (2) | ≈2 | 19.2 | 38 |
| $SiO_2$ (3) | ≈1.45 | 37.2 | 54 |
| $TiO_xN_y$ (4) | ≈2.35 | 118.5 | 278 |
| $SiAl_xO_y$ (5) | ≈1.48 | 85 | 126 |

Example 2

Figure 2:
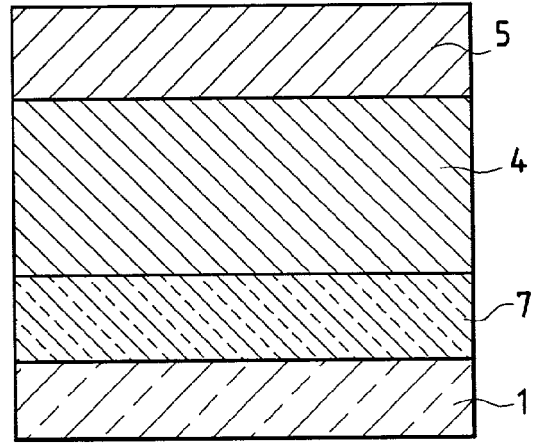
FIG. 2 depicts a second embodiment of a substrate with an antireflective coating of the invention.

This example repeats the multilayer stack of Example 1, but replaces, as shown in FIG. 2, the layers 2 and 3 with a single intermediate-index layer 7 made of silicon oxynitride $SiO_xN_y$, the nitrogen content of which is varied in order to adjust the index to a value of about 1.78.

Table 2 gives the index and the physical and optical thicknesses of the layers in the multilayer stack for this three-layer coating.

TABLE 2

| Glass (1) | Index | Physical Thickness (nm) | Optical Thickness (nm) |
|---|---|---|---|
| $SiO_xN_y$ (7) | 1.78 | 60 | 107 |
| $TiO_xN_y$ (4) | ≈2.35 | 118.5 | 278 |
| $SiAl_xO_y$ (5) | ≈1.48 | 85 | 126 |

Example 3

This example repeats the three-layer stack configuration of Example 2, but uses another type of modified titanium oxide layer. Instead of layer 4 being $TiO_xN_y$, layer 4 is a layer of titanium oxide containing tantalum with a Ta/Ti atomic percent proportion in the layer of about 10 to 15%, preferably 13% (a Ti—Ta alloy target in suitable proportions is used), so that the index of the layer is about 2.33 to 2.40, preferably 2.35 (the optical thicknesses are the same as in Example 2).

The following multilayer stack is therefore obtained:

| Glass (1) | / | $SiO_xN_y$ (7) | / | $Ti-Ta_xO_y$ (4) | / | $SiAl_xO_y$ (5) |
|---|---|---|---|---|---|---|

It was confirmed that the tantalum-modified titanium oxide allowed deposition rates to be achieved that were 40% higher than those with $TiO_2$.

Example 4

This example is identical to Example 3, except that the titanium oxide is modified by zirconium instead of tantalum. Layer 4 has the formula $TiZr_xO_y$, with a refractive index of about 2.24 to 2.39, preferably 2.30, for a Zr atomic percent value in the layer of about 25 to 30%, preferably 27%. It was confirmed that the titanium oxide modified by zirconium has a deposition rate 20% higher than $TiO_2$.

Example 5

Figure 3:
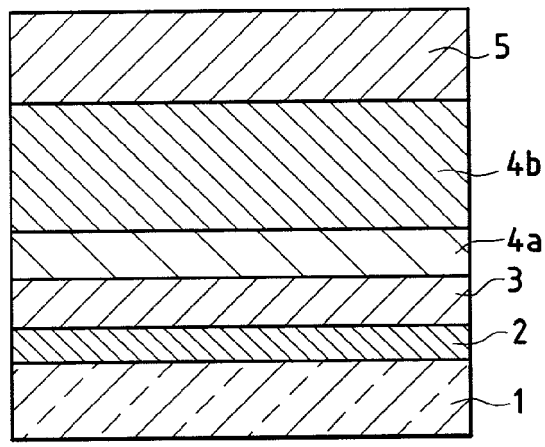
FIG. 3 depicts a third embodiment of a substrate with an antireflective coating of the invention.

This example is illustrated in FIG. 3. FIG. 3 depicts a five-layer stack in which layers 2, 3, and 5 are of the same type as those in Example 1. The difference between this Example and Example 1 is that the high-index layer 4 is replaced by a bilayer comprising the sequence $SnO_2/TiO_2$. This is a variant according to the invention in which the index of the titanium oxide layer (4b) is modified by combining it with a layer (4a) of a material which still falls within the definition of a high-index (at least 1.9) layer but has an index less than that of the standard $TiO_2$. The bilayer (4a+4b) is given an optical thickness similar to that of the layer 4 in Example 1.

Table 3 gives the index and the physical and optical thicknesses of the layers in the multilayer stack for this five-layer coating.

TABLE 3

| Glass (1) | Index | Physical Thickness (nm) | Optical Thickness (nm) |
|---|---|---|---|
| $SnO_2$ (2) | ≈2 | 12.5 | 25 |
| $SiO_2$ (3) | ≈1.45 | 29.2 | 42 |
| $SnO_2$ (4a) | ≈2 | 29.6 | 59 |
| $TiO_2$ (4b) | ≈2.45 | 94.4 | 231 |
| $SiAl_xO_y$ (5) | ≈1.48 | 80.6 | 119 |

Example 6

Figure 4:
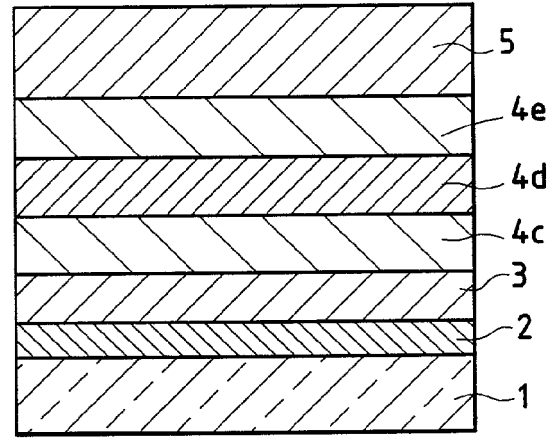
FIG. 4 depicts a fourth embodiment of a substrate with an antireflective coating of the invention.

This example repeats the data in Example 5 but replaces the bilayer 4a-4b with a trilayer 4c-4d-4e according to FIG. 4.

This trilayer is composed of the sequence:

$TiO_2$ / $SnO_2$ / $TiO_2$
(4c)   (4d)    (4c)

Here there are therefore two "standard" $TiO_2$ layers flanking an $SnO_2$ layer of lower index. Again, the trilayer 4c-4d-4e is given approximately an overall optical thickness close to that of the bilayer of Example 5 or the monolayer of Example 1 (in fact, a value approximately on the order of $\lambda/2$, with $\lambda$=580 run)

Table 4 below gives the index and the physical and optical thicknesses of the layers in this multilayer stack.

TABLE 4

| Glass (1) | Index | Physical Thickness (nm) | Optical Thickness (nm) |
|---|---|---|---|
| $SnO_2$ (2) | ≈2 | 18.5 | 27 |
| $SiO_2$ (3) | ≈1.45 | 33.8 | 49 |
| $TiO_2$ (4c) | ≈2.45 | 33.9 | 83 |
| $SnO_2$ (4d) | ≈2.00 | 32.9 | 66 |
| $TiO_2$ (4e) | ≈2.45 | 32.9 | 81 |
| $SiAl_xO_y$ (5) | ≈1.48 | 87 | 129 |

It should be noted that in all the previous examples it is possible to substitute the $SiAl_xO_y$ layers 5 simply with $SiO_2$ layers, the presence of aluminum, however, increases the durability of the layer and, consequently, of the multilayer stack in its entirety.

Likewise, substituting the first multilayer sequence with an intermediate layer, as was done in Example 3, may also be done in the other examples.

The optical thicknesses were chosen to minimize reflection at normal incidence.

By way of comparison, a Comparative Example 5a, in which the $SnO_2/TiO_2$ bilayer is replaced with a standard $TiO_2$ (2.45 index) monolayer having an optical thickness equivalent to that of the bilayer (optical thickness: 262 nm; physical thickness: 107 nm), was also produced.

This example is therefore of the type:
Glass/$SnO_2$/$SiO_2$/standard $TiO_2$/$SiAl_xO_y$ The values of $R_L$ (in %) and of a* and b*, in the (L*, a*, b*) colorimetry system, of the substrates coated according to Example 5 and Example 5a were then measured at various angles of incidence, $\alpha$ ($\alpha$=0 corresponds to normal incidence)

The results are given in Table 5 below:

TABLE 5

|  | Example 5a | Example 5 |
|---|---|---|
| $\alpha = 0$ |  |  |
| $R_L$ | 0.80 | 0.80 |
| a* | −3.00 | −3.00 |
| b* | −3.00 | −3.00 |
| $\alpha = 20°$ |  |  |
| $R_L$ | 1.04 | 1.01 |
| a* | −4.46 | −4.23 |
| b* | −2.01 | −1.45 |
| $\alpha = 40°$ |  |  |
| $R_L$ | 2.52 | 2.45 |
| a* | −3.20 | −2.70 |
| b* | −3.30 | −1.00 |
| $\alpha = 60°$ |  |  |
| $R_L$ | 10.75 | 10.95 |
| a* | +0.47 | −0.61 |
| b* | −4.09 | −0.45 |
| $\alpha = 70°$ |  |  |
| $R_L$ | 24.54 | 25.04 |
| a* | +1.26 | −0.23 |
| b* | −2.76 | −0.43 |

The data in Table 5 shows that the coated substrate of Example 5 is more favorable from the calorimetric standpoint than the coated susbtrate of Example 5a from two standpoints:

1. Even at an unfavorable angle of incidence ($\alpha$=60° or 70°), the example according to the invention keeps the signs of a* and b* unchanged, both these being negative, i.e., a bluish appearance is retained. On the other hand, in the case of comparative Example 5a, a* becomes positive, which means that the color switches to another tint; and 2. There is a general trend, for the example according to the invention, that as soon as one moves away from normal incidence, to have, in absolute values, a* and b* values that decrease (the saturation c* decreases), i.e., there is a tendency to move towards neutrality in reflection when $\alpha$ increases. This is favorable since, in parallel, and as seems to be inevitable, the value of $R_L$ itself tends to increase, so that the overall increasing level of reflection is less penalizing, since it is "compensated for" by the increase in color neutrality.

Example 7

This example repeats the data in Example 5, but reverses the order of layers 4a and 4b.

The following multilayer stack is thus obtained:

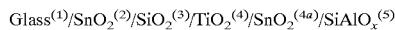

The thicknesses of each of the layers of the same type is the same as in Example 5.

Example 7 gives good results from the optical standpoint and confirms that in the embodiment of the invention in which a layer of material having a lower index is combined with $TiO_2$, it is possible to choose to place the $TiO_2$ above or below the layer.

Example 8

This example repeats the data in Example 7, but substitutes the two $SnO_2$ layers 2 and 4a with $Si_3N_4$ layers (having the same thickness, the refractive indices of these two materials being approximately the same, around 2).

The following multilayer stack is thus obtained:

Example 9

This example repeats the data in Example 7, but replaces the $SnO_2$ layer 4a with a silicon nitride layer.

The following multilayer stack is thus obtained:

Examples 8 and 9 use $Si_3N_4$, this material is used to give the entire multilayer stack better durability, especially mechanical durability. To obtain this improvement in an optimum fashion, it is the layer which lies just below the final low-index layer which must be made of $Si_3N_4$, as is the case in Example 9. A second $Si_3N_4$ layer, as in Example 8, further increases the improvement in durability.

The substrates in Examples 5, 7, 8, and 9, in particular, are coated substrates that can be curved or toughened, i.e., the glass substrates may, after the layers have been deposited, undergo a heat treatment at about 500 to 550° C. without significant optical alteration. One explanation for this remarkable property is that combining the $TiO_2$ layer with another layer allows $TiO_2$ to be used in smaller thicknesses. Thinner $TiO_2$ layers would have less ability to crystallize and be optically modified by the effect of the heat than $TiO_2$ layers exceeding a certain thickness, for example 100 nm.

The absence of crystallization, or only slight crystallization, due to the effect of the heat is also observed when $TiO_2$ is chemically modified in the embodiment of the invention in which a metal "dopant" is incorporated into the $TiO_2$.

In conclusion, the antireflection coatings according to the invention are highly effective from the optical standpoint. Furthermore, in at least some of the embodiments of the invention, they are extremely durable from the mechanical standpoint and can be curved or toughened. They can be used for equipping buildings and for protecting paintings. They may also be used for screens of all kinds, especially computer screens. In the latter case, there is generally a screen glass sheet with, on the "user side," an antireflection coating and, on the other side, another antireflection coating which is also antistatic (for example, by replacing a substantial part of a high-index layer of the multilayer stack with a conducting layer of the tin-doped indium oxide ITO type). The multilayer stack may start with 10 nm of ITO and there may be structural symmetry between the two antireflection coatings provided on a substrate with both coatings, or only one of the coatings, following the teaching of the invention. The antireflection coating of the invention may also have other properties, especially the ability to filter out ultraviolet radiation, for example by incorporating cerium oxide into at least one of its layers.

What is claimed is:

1. A transparent substrate having at least one surface comprising, an antireflection coating comprising a multilayer stack having alternating layers of high and low refractive indices, comprising:
   (a) at least one high-index multilayer having a refractive index value higher than 1.9 and lower than 2.45, comprising a trilayer with alternatively one titanium oxide layer, one tin oxide layer and one titanium oxide layer; and
   (b) at least one low-index layer having a refractive index of from 1.30 to 1.65,
   wherein the high-index multilayer is positioned further from the transparent substrate relative to a layer having a refractive index lower than the titanium oxide layer.

2. The transparent substrate of claim 1, wherein said high-index multilayer has a refractive index ranging from 2.25 to 2.38.

3. The transparent substrate of claim 1, wherein said multilayer stack comprises a dielectric material, a low emissivity material, or a solar-protection coating.

4. The transparent substrate of claim 1, wherein said at least one low-index layers comprises one or more of silicon oxide, aluminum oxide, aluminum oxyfluoride, aluminum fluoride, magnesium fluoride, or mixtures thereof.

5. The transparent substrate of claim 4, wherein said at least one low-index layers comprise at least one of halogenated silicon oxide or halogenated aluminum oxide.

6. The transparent substrate of claim 4, wherein the layer of said antireflection coating most removed from said substrate is a low-index layer comprising a SiO2-Al$_2$O3, wherein the atomic percent of aluminum with respect to silicon is from 5 to 20 percent.

7. The transparent substrate of claim 1, which further comprises a high index layer distinct from the high-index multilayer, having a refractive index of between 1.9 and 2.2 and which comprises tantalum oxide, zirconium oxide, tin oxide, indium oxide, zinc oxide, niobium oxide, silicon nitride, or aluminum nitride.

8. A glazing comprising the transparent substrate of claim 1.

9. The glazing of claim 8, further comprising a layer or multilayer stack that is a solar protection layer, a heat absorbing layer, a UV protecting layer, an antistatic layer, a low emissivity layer, a heated layer, an anti-fouling layer, a hydrophobic organic layer having an anti-rain function, a hydrophilic organic layer having an anti-fogging function, or a silvering layer.

10. The glazing of claim 8, wherein the glazing comprises extra-clear glass or solid-tinted glass.

11. The glazing of claim 8, wherein the glazing comprises a transparent polymer material.

12. The glazing of claim 11, wherein the transparent polymer material comprises a polycarbonate or a polyacrylate.

13. The glazing of claim 8, comprised in internal or external glazing for buildings, a motor-vehicle window, a mirror, a display screen, a decorative glass, a shop window, a shop-counter, or a refrigerated display-cabinet.

14. A motor vehicle window comprising the glazing of claim 8.

15. A mirror comprising the glazing of claim 8.

16. A display screen comprising the glazing of claim 8.

17. A shop window comprising the glazing of claim 8.

18. A glass comprising the glazing of claim 8.

19. The glazing of claim 10, wherein the glazing is toughened, reinforced, curved, or bent.

* * * * *

UNITED STATES PATENT AND TRADEMARK OFFICE
CERTIFICATE OF CORRECTION

PATENT NO. : 7,005,188 B2
APPLICATION NO. : 09/761765
DATED : February 28, 2006
INVENTOR(S) : Anderson et al.

It is certified that error appears in the above-identified patent and that said Letters Patent is hereby corrected as shown below:

<u>Title page,</u>
Item [73], should read:
-- [73]  Assignee: Saint-Gobain Glass, Courbevoie (FR) --.

Signed and Sealed this

Twentieth Day of June, 2006

JON W. DUDAS
*Director of the United States Patent and Trademark Office*